Sept. 13, 1932.   G. R. SIEGRIST   1,877,070
LUBRICATING SYSTEM
Filed April 28, 1926   3 Sheets-Sheet 1

INVENTOR
George R. Siegrist
BY
Parker & Burton
ATTORNEY

Sept. 13, 1932.  G. R. SIEGRIST  1,877,070
LUBRICATING SYSTEM
Filed April 28, 1926   3 Sheets-Sheet 2

INVENTOR
George R. Siegrist
BY
Parker & Burton
ATTORNEY

Sept. 13, 1932. G. R. SIEGRIST 1,877,070

LUBRICATING SYSTEM

Filed April 28, 1926 3 Sheets-Sheet 3

INVENTOR
George R. Siegrist
BY
Parker & Burton
ATTORNEY

Patented Sept. 13, 1932

1,877,070

UNITED STATES PATENT OFFICE

GEORGE R. SIEGRIST, OF PORT HURON, MICHIGAN

LUBRICATING SYSTEM

Application filed April 28, 1926. Serial No. 105,097.

My invention relates to improvements in lubricating systems for road vehicles.

The object is to provide a lubricating system for a road vehicle particularly intended to supply lubricant to those parts of the vehicle chassis which require lubricant, which system is so constructed and arranged that it responds automatically as the vehicle travels over the road to supply lubricant at desired intervals to the parts needing the same.

My improved lubricant pumping apparatus which communicates with the parts to be lubricated is of such a character as to operatively respond to a determined range of chassis movement produced by road travel of the vehicle, which range is less than the complete permitted range of chassis movement. Such pumping apparatus is so coupled with certain chassis parts having a permitted relative movement upon travel of the vehicle over the road as to be operated thereby when such relative movement produced by road travel of the vehicle has exceeded an allowable minimum range of movement not sufficient to actuate the pumping apparatus.

Through a predetermined minimum range of chassis movement the pumping mechanism remains idle but when the chassis movement passes beyond such permitted minimum range the pumping mechanism responds to pump lubricant to the parts with which it communicates to supply lubricant.

The chassis of a road vehicle is normally carried upon wheel-supported axles by suitable shock absorbing apparatus, such as suspension springs, and my improved lubricant pumping mechanism is operatively responsive to relative movement of certain chassis parts after a permitted play thereof has been allowed for.

Various features and advantageous of my invention will more fully appear from the following specification, appended claims and accompanying drawings, in which:—

The vehicle chassis has a number of parts which should be lubricated at determined intervals, such as shackle bolts, pivots, and bearings of different kinds, and I provide a main lubricant dispensing mechanism mounted at a suitable place upon the chassis and having suitable conduits leading to each of the parts to be lubricated to supply each of said parts with lubricant, flexible connections and other fittings being provided in places where needed. I have here shown my main lubricant pumping apparatus as mounted upon a side frame member of the vehicle.

Figure 5:
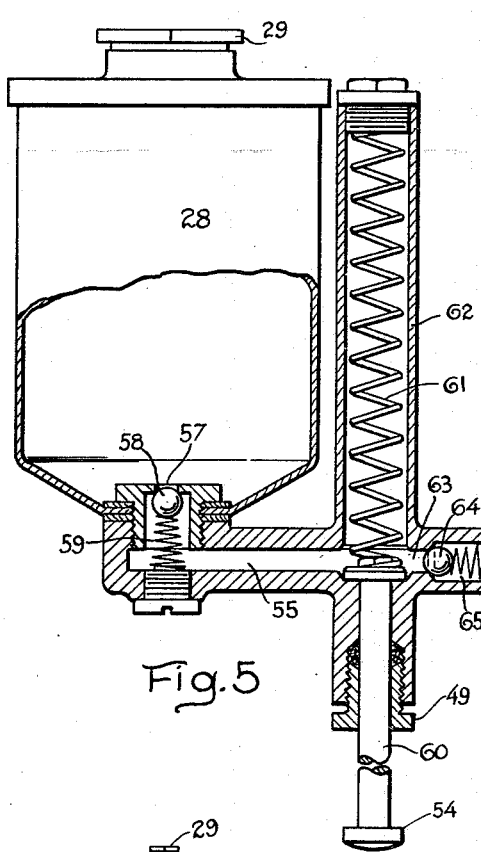
Fig. 5 is a side elevation partly broken of one form of my invention.
Figure 6:
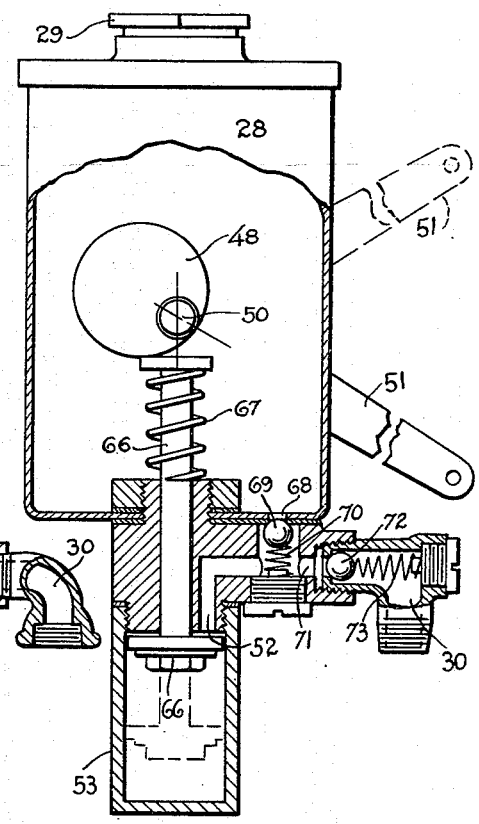
Fig. 6 is a vertical sectional view partly broken away of a modified form of my invention.

In the drawings, I have illustrated a vehicle chassis having axles 25, wheels 26, side frame members 27, and various parts to be lubricated. The lubricant pump comprises a container or a receptacle 28 having a removable closure cap 29 through which the same may be filled with lubricant, which container also carries pumping mechanism that delivers the lubricant to parts adapted to receive it and which is of suitable size to carry a desired quantity of lubricant. In Figs. 5 and 6 I have illustrated the container in elevation and cross section and it is shown as having an outlet for lubricant leading to a conduit 30. This conduit is provided with suitable branches such as 31, that lead to various parts of the chassis which are to be supplied with lubricant.

Figure 1:
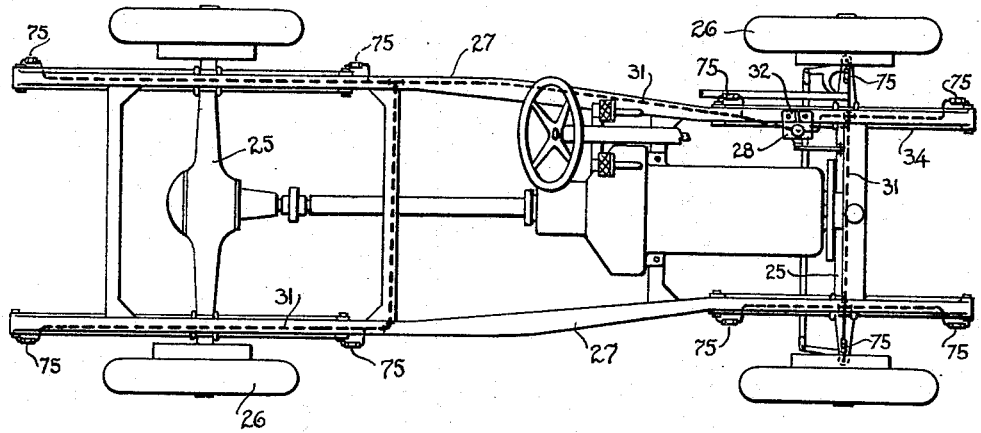
Figure 1 is a plan of a road vehicle chassis provided with my invention.

Suitable pumping apparatus of any desired character is provided and is coupled with certain parts of the vehicle chassis which are adapted for relative movement upon road travel of the vehicle to be operatively actuated thereby. This connection may be made with different parts of the vehicle chassis as there are different parts which have permitted relative movement under road travel. In each of the figures of the drawings I have shown the container 28 as mounted upon the side frame member. In Fig. 1, I have shown each container as supported by a bracket 32 which is secured to a side frame member and I have shown a connection leading to different parts of the chassis.

Figure 2:
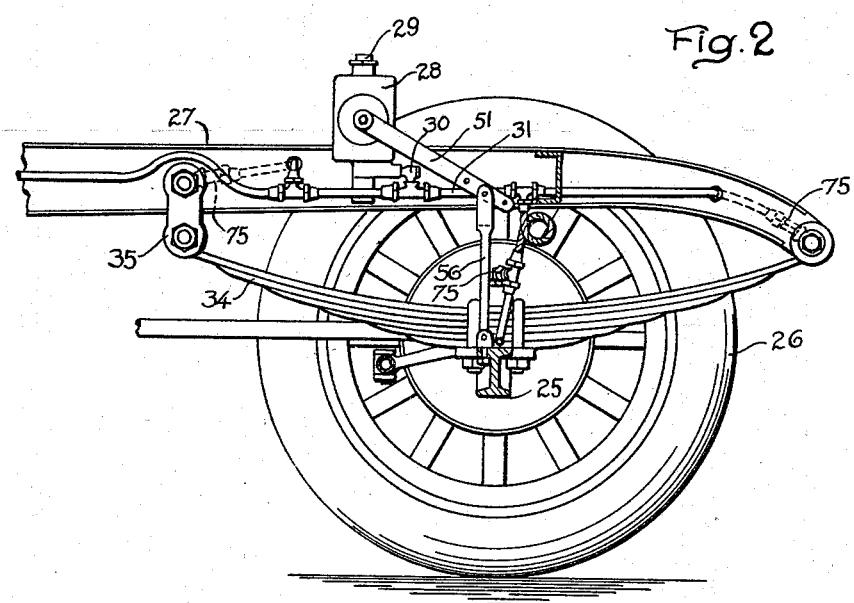
Fig. 2 is a fragmentary elevation of my invention mounted on a road vehicle chassis.
Figure 3:
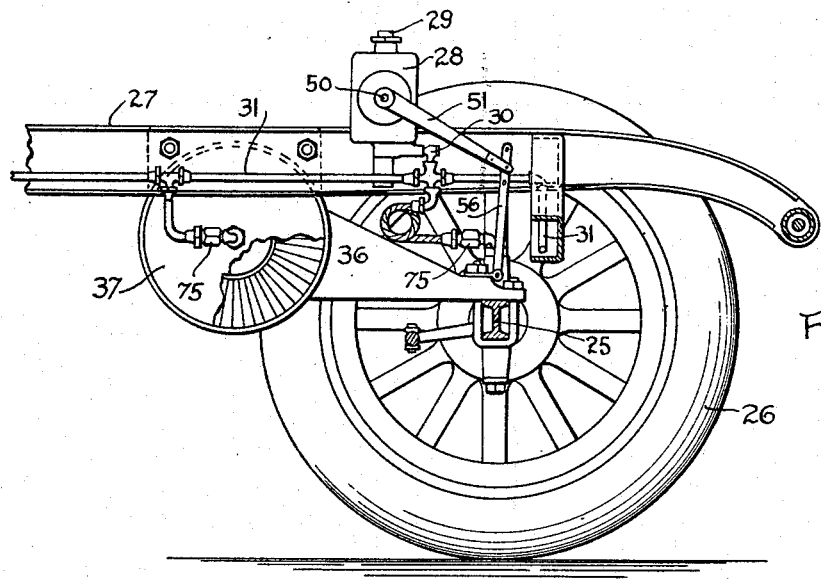
Figs. 3 and 4 are separate fragmentary elevations of my invention mounted on a road vehicle chassis in connection with different types of shock absorbing devices.
Figure 4:
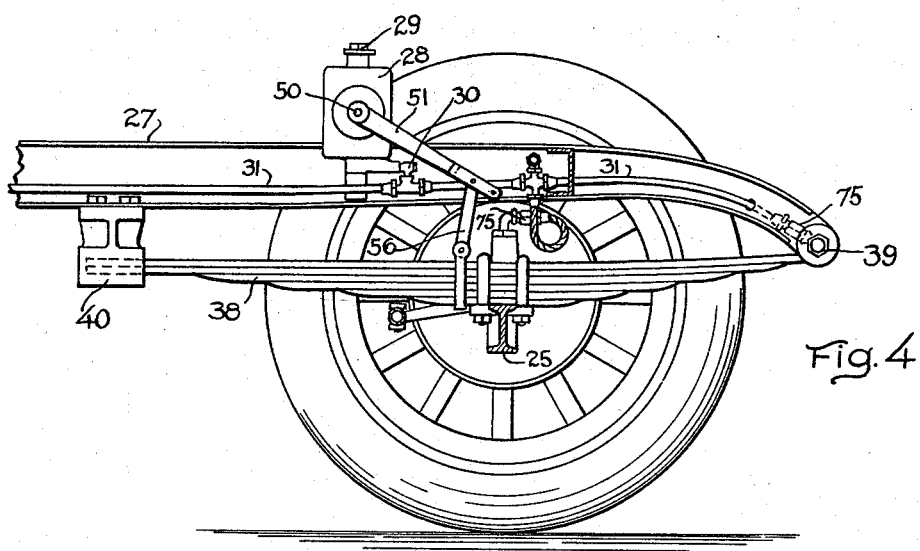

In Figs. 2, 3 and 4, I have shown different types of shock absorbing devices interposed between the axles 25 and the frame 27 of the chassis. My operating mechanism is adaptable for use with different types of shock absorbing devices.

In Fig. 2, I have shown the usual suspension spring 34 pivoted to the frame at its forward end and connected therewith at its rear by a shackle 35.

In Fig. 3, I have shown a shock absorbing device in the form of an arm 36 which has a face plate provided with a series of corrugations arranged in the form of an annulus interlocked with an annular shock absorbing member which may be formed of rubber that is also interlocked with a stationary bracket 37 to take up the jar of travel. This forms no part of my invention other than to illustrate the adaptability of my apparatus for use with a second form of shock absorbing device.

In Fig. 4, I have shown a suspension spring 38 which is pivoted at 39 to the frame and at the rear extends through a suitable bracket support 40.

These constructions are all well known and form no material part of the invention.

In Figs. 5 and 6, I have illustrated two specific forms of pumping mechanism either of which is adaptable to illustrate my invention. In Fig. 5 the receptacle 28 has a discharge outlet 57 controlled by a ball check valve 58 held to its seat by a spring 59. This check valve 58 regulates the flow of lubricant from the container 28 to the chamber 55. This chamber 55 communicates with a pump cylinder 62. A plunger 60 is held downwardly by a spring 61 housed within this cylinder. This plunger extends outwardly through a packing nut 49 and is provided with a bearing face 54 which is adapted to be engaged by the end of the arm 74, which arm is secured to the axle shown in Fig. 7. A determined shock of the vehicle chassis producing relative movement of the axle and frame caused by travel of the vehicle over the road will bring the arm 74 into engagement with the end of the plunger 60, forcing the plunger upwardly within the cylinder 62 against the tension of the spring 61, thereby creating a suction which will open the valve 58 drawing lubricant from the container 28 into the chamber 55 and the cylinder 62. Upon the return throw of the shock absorbing device which draws the arm 74 away from the plunger 60, the spring 61 forces this plunger downwardly, closing the valve 58 and forcing the lubricant through the passageway 63, unseating the ball check valve 64, which is held normally seated by spring 65, the lubricant passing to the conduit 30 to be distributed through branches thereof to the several parts of the chassis with which communication is established.

Fig. 6 is a second form of pumping mechanism. An arm 51 is mounted upon one arm of a shaft 50, which shaft has a bearing in the container 28. This arm is connected through a link 56, as shown in Figs. 2 to 4, with the axle so that relative movement of the axle frame member will swing the arm, thereby oscillating the shaft 50. The arm 51 is shown as provided with a plurality of adjustments for attachment to the link 56.

A cam 48 is mounted upon the shaft 50 within the container. Oscillatory rotation of the shaft 50 will oscillate the cam 48. In the specific construction shown in Fig. 6 a plunger is held in engagement with the cam by a spring 67. This plunger is mounted within a pump cylinder 53 which communicates through a passageway 52 and port 68 with the container 28. The port 68 is normally closed by a ball check valve 69 held to its seat by a spring 70.

The arm 51 has a normal position such as shown in solid line, Fig. 6. When the shock absorbing device that supports the chassis upon the axle takes the shock of a road jar during the travel of the vehicle and the arm moves upwardly to the position shown in dotted outline in Fig. 6, the plunger 66 is forced downwardly by the cam 48, the valve 69 is opened, and the lubricant enters the passageway 52 of the cylinder 53. When the arm 51 returns to the position shown in solid outline in Fig. 6, the spring 67 draws the plunger 66 upwardly, closing the valve 69 and forcing the lubricant through the passageway 71, unseating the valve 72 which is held to its seat by a spring 73, and discharges the lubricant through the conduit 30, as hereinafter described.

Figure 7:
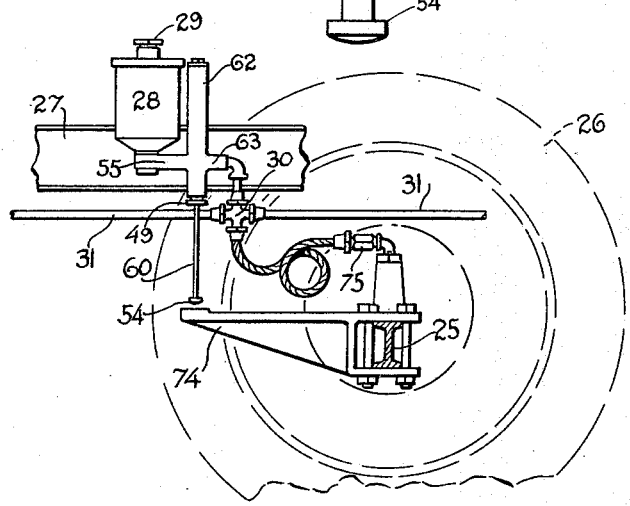
Fig. 7 is a view showing the apparatus of Fig. 6 in place on a vehicle.

In Fig. 7 the plunger 60 is shown as spaced above the bracket 74 which is carried by the axle so that there is a permitted movement of the bracket before it engages the plunger to actuate the same, while in Fig. 6 though the cam oscillates upon initial movement of the coupling mechanism its oscillation must pass a certain point before the plunger 41 will be depressed sufficiently to intake lubricant. It will be seen, therefore, that a permitted relative movement of the parts to which the connection is made is provided for before the pump operatively responds. The operation of the pump throughout this predetermined range serves to deliver lubricant through the branches 31 of the conduit 30 to the various parts of the chassis adapted to receive lubricant as described,

What I claim is:

1. In a lubricating system for a road vehicle, having a part adapted to receive lubricant, lubricant pumping mechanism communicating therewith to feed lubricant thereto, said pumping mechanism responsive to the vibration produced by travel of the vehicle over the road to pump lubricant under pressure to the part adapted to receive the same, said pumping mechanism responsive only to a determined range of vibration which range is less than the permitted range of vibration, said lubricant pumping mechanism including a pump chamber communicating with a lubricant container by a valve controlled passageway to receive lubricant therefrom and having a valve controlled discharge outlet to the part to be lubricated.

2. In a lubricating system for a road vehicle, having a part adapted to receive lubricant and members relatively movable upon travel of the vehicle over the road, lubricant pumping mechanism communicating with said part to feed lubricant thereto, and means coupling the pumping mechanism with the relatively movable parts to be operatively actuated thereby upon travel of the vehicle over the road to pump lubricant to the part adapted to receive the same, said pumping mechanism so coupled with said parts as to have a permitted play over a determined range insufficient to operatively actuate said pumping mechanism, said lubricant pumping mechanism including a pump chamber communicating with a lubricant container by a valve controlled passageway to receive lubricant therefrom and having a valve controlled discharge outlet to the part to be lubricated.

In testimony whereof, I sign this specification.

GEORGE R. SIEGRIST.